(Model.)
E. F. CRAWFORD.
DRAG SAW.
No. 301,216. Patented July 1, 1884.
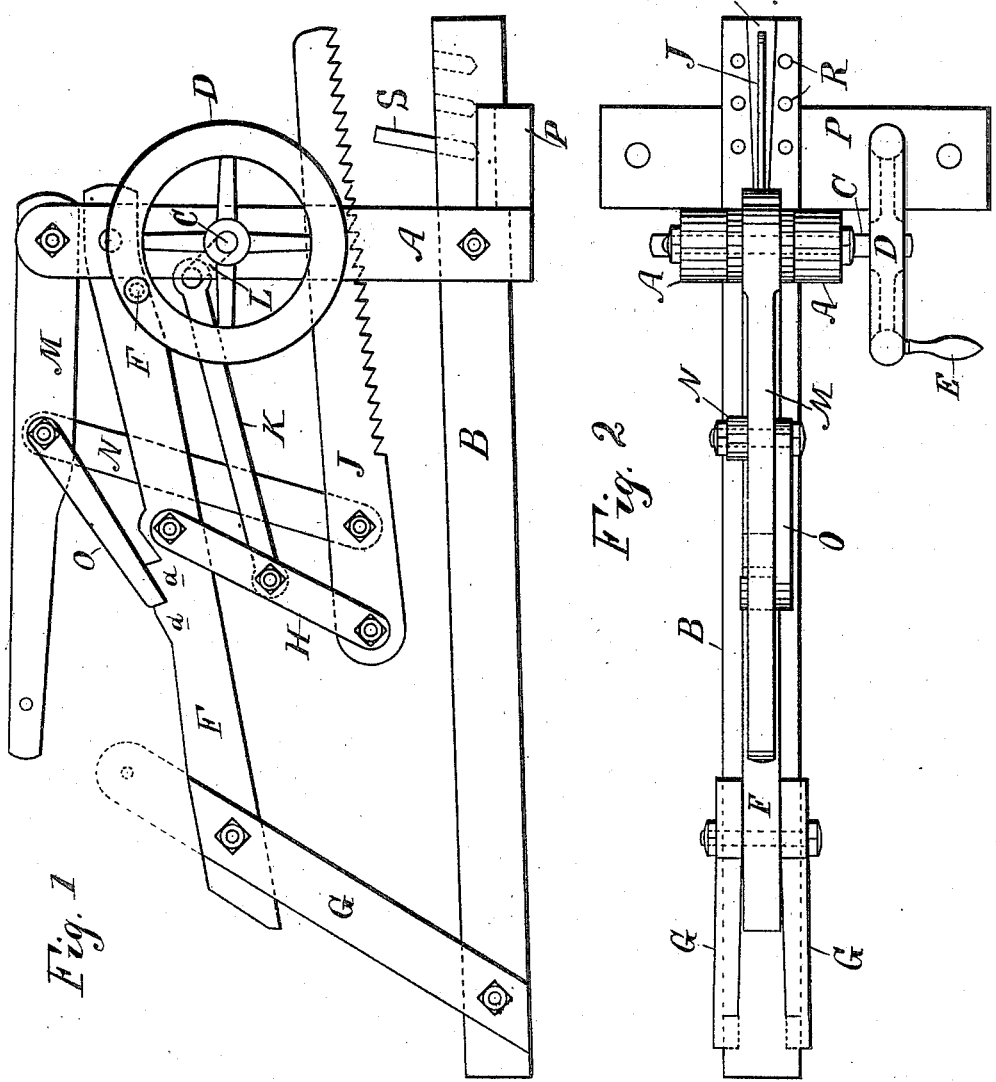
WITNESSES:
V. H. Ernst.
C. Sedgwick
INVENTOR:
E. F. Crawford
BY Munn & Co
ATTORNEYS.

UNITED STATES PATENT OFFICE.

EDWARD F. CRAWFORD, OF HONEY BEND, ILLINOIS.

DRAG-SAW.

SPECIFICATION forming part of Letters Patent No. 301,216, dated July 1, 1884.

Application filed May 2, 1884. (Model.)

*To all whom it may concern:*

Be it known that I, EDWARD FRANCIS CRAWFORD, of Honey Bend, in the county of Montgomery and State of Illinois, have invented a new and Improved Sawing-Machine, of which the following is a full, clear, and exact description.

The object of my invention is to provide a new and improved sawing-machine for sawing logs, boards, &c.

The invention consists in the combination, with a frame, of a saw pivoted in the same, a crank-shaft for reciprocating the saw, and a lever connected with the saw for the purpose of raising the same, and a pawl pivoted to the said lever for the purpose of holding the saw raised more or less. The base of the frame has a flaring groove formed on the upper surface in the front projecting end.

Reference is to be had to the accompanying drawings, forming part of this specification, in which similar letters of reference indicate corresponding parts in both the figures.

Figure 1 is a side view of my improved sawing-machine. Fig. 2 is a plan view of the same.

Two standards, A, are secured on one end of a base, B, and in the same a transverse shaft, C, is journaled, on one end of which a fly-wheel, D, is rigidly mounted, and which is provided with a crank-handle, E. A top beam, F, is held between the upper parts of the standards A, and to two upright or inclined standards, G, secured to the rear end of the base B. A connecting-bar, H, is pivoted to the side of the top beam, F, and to the lower end of the said bar the butt-end of the saw J is pivoted, which saw projects between the two standards A. The bar H is connected by a rod, K, with a crank, L, on the shaft C, so that the saw will be reciprocated by revolving the shaft C. A lever, M, pivoted to the standards A above the bar F, is connected near its center by a bar, N, with the saw J a short distance in front of the butt-end of the same. A few teeth, *a*, are formed in the top edge of the top bar, F, and a pawl, O, is pivoted to the lever M, the free end of said pawl being adapted to be rested against the teeth *a*. The front end of the base B rests upon and is secured to a transverse beam, P, and in the front end of the base a longitudinal groove, Q, is formed in the upper surface. At the sides of the said groove apertures R are formed for receiving the pins S for holding the log in place. The groove Q serves to receive the cutting-edge of the saw after the same has passed through the log.

The saw can be raised by means of the lever M, and held in the raised position by means of the pawl O. Instead of revolving the crank-shaft directly from the fly-wheel, suitable gearing can be interposed to operate the shaft from the fly-wheel, whereby a greater speed of the saw can be obtained.

The height of the rear standards, G, can be increased, so that the lever M can be pivoted in the said standards, and the saw can be reversed, so as to project from the rear. Two guide-straps are preferably secured to the standards A or G, for the purpose of guiding the saw, but are not absolutely necessary.

Having thus described my invention, I claim as new and desire to secure by Letters Patent—

1. In a sawing-machine the combination, with a frame, of the bar H, pivoted to the same, the saw J, pivoted to the said bar, the lever M, pivoted on the frame, the bar N, connecting the saw with the lever M, and the pawl O, pivoted to the lever M and adapted to rest against the teeth *a* of the bar F, substantially as herein shown and described.

2. In a sawing-machine, the combination, with the standards A, having the cross-bar P, the bars G, and beam F, of the base B, having upon the sides of a groove, Q, series of adjusting-holes R, which receive the log-holding pins S, and the saw J, suspended by a bar, H, from the beam F, said bar H being connected by a rod or pitman, K, to a crank-shaft, substantially as and for the purpose set forth.

EDWARD F. CRAWFORD.

Witnesses:
    E. M. GILMORE,
    C. W. WARD.